Patented Dec. 30, 1947

2,433,802

UNITED STATES PATENT OFFICE 2,433,802

QUATERNARY AMMONIUM SALTS OF MELAMINE-FORMALDEHYDE CONDENSATION PRODUCTS

Herbert J. West, Stamford, Conn., assignor to American Cyanamid Company, New York, N. Y., a corporation of Maine No Drawing. Application February 12, 1943, Serial No. 475,669

11 Claims. (Cl. 260—67.7)

This invention relates to quaternary ammonium salts of melamine-formaldehyde condensation products and to their methods of preparation. The invention includes the quaternary ammonium salts themselves, their methods of preparation and compositions containing the products.

In the preparation of creaseproofing and water-repellent finishes for textiles, as well as for a wide variety of other purposes, water-soluble or water-dispersible melamine-formaldehyde condensation products are highly desirable. It is a principal object of the present invention to provide a class of salts or derivatives of melamine-formaldehyde condensation products that are soluble or easily dispersible in water, and which can therefore be applied in the form of aqueous solutions or suspensions. A further important object of the invention resides in the provision of a class of water-soluble or water-dispersible derivatives of melamine-formaldehyde condensation products that will dissociate and deposit water-insoluble and curable polymers of melamine-formaldehyde condensation products upon simple heating.

I have found that uncured melamine-formaldehyde condensation products, including the methylol melamines obtained by simple condensation of melamine with formaldehyde solutions and also the alkylated or alcohol-reacted methylol melamines, can be reacted with salts of tertiary nitrogen bases to form a new class of quaternary ammonium salts of melamine-formaldehyde condensation products. These new products are obtained by heating one molecular equivalent of uncured melamine-formaldehyde condensation products with 1 or 2 moles of a salt of a tertiary nitrogen base at temperatures not substantially above 80° C., and preferably at temperatures on the order of 30–40° C. up to about 70° C. The reaction may be carried out either in the presence or absence of solvents and for varying periods of time, depending on the particular nature of the reagents and the reaction conditions, but in all cases water-soluble or water-dispersible products are obtained. These products can be isolated in the form of dry powders by drying at temperatures below 80° C. or by pouring the reaction product into acetone or other ketones, in which they are insoluble.

It is well known that melamine condenses with aqueous formaldehyde solutions in ratios of 2 to 6 moles of formaldehyde for each mole of melamine to form monomeric or partially polymerized methylol melamines that can be cured to hard, infusible resins by further heating. It is also known that these methylol melamines can be further reacted with monohydric and polyhydric alcohols in the presence of small amounts of acid condensing agents to form alcohol-reacted products which are known as alkylated methylol melamines and are probably ethers of some or all of the —CH$_2$OH groups of the methylol melamines and the alcohol used. The methylol melamines and their alcohol reaction products or ethers are known generally as melamine-formaldehyde condensation products. In preparing the quaternary ammonium salts of the present invention they are used in their uncured state; i. e. as unpolymerized or only partially polymerized products corresponding generally to the respective formulas

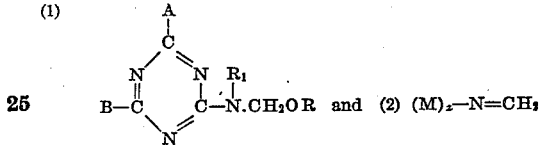

In (1) A is a radical of the group consisting of —NH$_2$, —NH.CH$_2$OR and —N(CH$_2$OR)$_2$; B is a radical of the group consisting of —NHCH$_2$ OR and —N(CH$_2$OR)$_2$; R$_1$ is hydrogen or CH$_2$OR; and R is hydrogen or an alcohol-forming radical i. e., the radical of the alcohol used to form an ether with the methylol melamine, as explained above. In (2), (M)$_x$ represents the nucleus of a partially polymerized but incompletely cured melamine-formaldehyde condensation product.

Any alcohol may be used in preparing the alkylated condensation products such as methyl, ethyl, propyl, isopropyl, butyl, isobutyl, amyl or the various isoamyl alcohols, and the invention in its broader aspects is not limited to the use of any particular alcohol. However, the water repellency of these products is greatly enhanced when at least one alcohol-forming radical of at least 6 carbon atoms is combined in the molecule thereof, and the preferred quaternary nitrogen salts of the present invention are therefore prepared with the aid of higher aliphatic alcohols such as octyl, decyl, dodecyl, tetradecyl or octadecyl alcohols.

Alcohols of the cycloaliphatic and aromatic series may also be employed as, for example, cyclohexanol and cycloaliphatic alcohols of 4 or more carbon atoms obtainable by the catalytic reduction of naphthenic acids or aromatic alcohols such as benzyl alcohol and its homologs.

Although salts of any tertiary nitrogen base can be condensed with the monomeric or uncured melamine-formaldehyde condensation products described above, the most important classes of compounds for this purpose are the salts of tertiary amines and the salts of pyridine and pyridine homologs. The salts of these two classes of compounds correspond respectively to the formulas

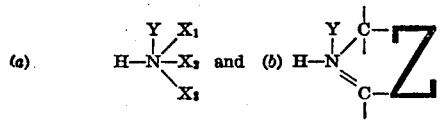

wherein $X_1$ $X_2$ and $X_3$ in the Formula $a$ are preferably lower alkyl radicals such as methyl or ethyl and Z in Formula $b$ is the residue of a pyridine base. In either formula Y is the anion of the acid that forms a salt with the tertiary nitrogen base and is preferably a halogen such as chlorine, bromine or iodine, although any acid sufficiently strong to form a salt with a tertiary nitrogen base may be employed. These salts are defined as a class by the formula

wherein N(tert) is the tertiary nitrogen base used and Y is as defined above. Suitable tertiary amines are trimethylamine, triethylamine and the like, while any pyridine base may be employed such as pyridine itself, or the alkyl substituted pyridines or picolines or pyridine bases containing condensed aromatic nuclei such as the quinolines.

In carrying out the process of my invention I prepare the quaternary ammonium salts of melamine-formaldehyde condensation products by heating together one or more compounds of each of the above-described classes at temperatures not substantially higher than 80° C. A solvent such as methanol, ethanol, etc. may be present in the reaction mixture if desired, and this is particularly advantageous in the preparation of large scale batches. The speed of the reaction is dependent largely upon the type of tertiary nitrogen base salt used, being much more rapid with salts of strong acids such as nitrates and hydrochlorides than with the corresponding salts of weak organic acids such as acetates. Salts of pyridine bases with inorganic acids such as hydrochloric, nitric and even sulfurous acid react quite rapidly with uncured melamine-aldehyde condensation products at temperatures of 50-70° C. to form condensation products that are easily soluble in water, and therefore the quaternary derivatives of these bases constitute a preferred class of the compounds of the present invention.

The exact mechanism of the reaction is difficult to determine since the tertiary nitrogen base salts, and particularly the pyridinium salts of strong inorganic acids are acidic in character and tend to cause partial polymerization of the melamine-formaldehyde condensation products during the heating period. However I believe that the condensation occurs at a hydroxy or alkoxy group of the melamine-formaldehyde condensation product with evolution of water or alcohol or at a methylene-imine group after partial polymerization has occurred, or both. These condensations are expressed by the following reactions, wherein A, B, R and Y are as previously defined and $(M)_x$ represents the nucleus of a partially polymerized but incompletely cured melamine-formaldehyde condensation product.

(I)

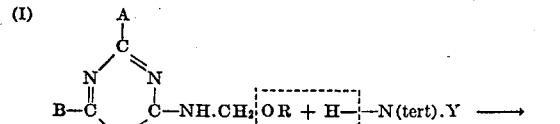

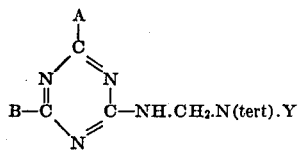

(II) $(M)_xN=CH_2+H-N(tert).Y \longrightarrow (M)_xNH.CH_2.N(tert).Y$

In any event, however, water-soluble or water-dispersible salts are obtained even when water-insoluble melamine-formaldehyde condensation products are employed as starting materials, and the invention in its broader aspects is not limited by the exact nature of the reaction.

The quaternary ammonium salts of the present invention decompose upon heating with liberation of the tertiary amine salt and formation of resinous melamine-formaldehyde condensation products. This is an extremely important property, for it permits the coating or impregnation of textiles, leather, paper or any other suitable materials with relatively cheap aqueous solutions or dispersions of melamine resins which can then be deposited in an insoluble but curable condition by simple heating. In some cases the decomposition is accelerated by the addition of an acid-binding substance such as sodium acetate or other salts of strong bases with weak acids which combine with the anion of the quaternary ammonium salt and so render the compound unstable. Thus, for example, in the production of paper of improved wet strength the pyridinium hydrochloride salt of tetramethylol melamine may be added to an 0.5-1% aqueous suspension of beaten kraft or sulfite wood pulp in the stock chest of a paper mill in amounts of 2-5%, based on the dry weight of the fibers, together with sodium acetate, sodium carbonate, or other soluble salt having an alkaline reaction. Decomposition of the water-soluble salt may be accelerated by heating the stock suspension and a polymerized methylol melamine is precipitated upon the fibers. Upon forming the stock into paper on a Fourdrinier or cylinder machine and subsequent drying at temperatures of 240-280° F. this is cured to a resin which improves remarkably the wet strength and other desirable properties of the paper.

The invention will be illustrated in greater detail by the following specific examples. It should be understood, however, that these examples are given primarily for purposes of illustration and that the invention in its broader aspects is not limited thereto.

*Example 1*

100 parts by weight of trimethylol melamine in dry form was added to 200 parts by weight of methyl alcohol containing ½ part by weight of oxalic acid. The mixture was heated to refluxing temperature until a clear solution was obtained. After adjusting the pH of the solution to 8.0 with dilute NaOH the solution was filtered and vacuum concentrated to produce an anhydrous viscous syrup which upon cooling gave a clear but somewhat tacky solid.

270 parts of the methylated methylol melamine thus obtained was heated with 270 parts of commercial stearyl alcohol plus 0.25 part of phthalic acid. The reaction was completed at a temperature of 130° C. under a vacuum of 27–28 in. Hg until a molecular equivalent of methanol was removed. The product was an opaque solid resin.

60 parts of the stearylated methylol melamine prepared as described in the preceding paragraph was mixed with 75 parts of a 17% pyridine hydrochloride solution in pyridine and 5 parts of paraformaldehyde. The mixture was then heated at 60° C. for 30 minutes, cooled to 0° C. and poured into acetone to precipitate the pyridine salt. The white precipitate was filtered, washed with a little acetone and dried at 50° C. The product was a white powder readily dispersible in water to give a soapy solution.

*Example 2*

100 parts by weight of dry tetramethylol melamine was added to 200 parts of butyl alcohol containing one part of oxalic acid and the mixture heated under a refluxing condenser until a clear solution was obtained. The reaction mixture was then neutralized with dilute NaOH, filtered and concentrated under a vacuum of 27–28 in. Hg at a final temperature of 100° C. at which point most of the excess butanol had been removed. On cooling a soft clear resin was obtained.

10 parts of the butylated tetramethylol melamine prepared as described above was heated for 5 minutes at 80° C. with 4 parts of pyridine hydrochloride and 10 parts of 95% ethyl alcohol. The reaction mixture was precipitated in acetone, filtered and dried. The product was a white powder completely soluble in water.

*Example 3*

300 parts by weight of solid methylated tetramethylol melamine and 130 parts by weight of commercial octyl alcohol were mixed in a reaction vessel equipped for vacuum distillation and the mixture heated slowly to 123° C. At this point a considerable amount of methyl alcohol had distilled out. A vacuum of 70 cm. was then applied and the heating and distilling continued to a temperature of 130° C. and held under these conditions until no more methyl alcohol would distill. The viscous liquid was removed from the reaction vessel and allowed to cool whereupon a plastic solid resin was obtained.

127 parts of the mono-octylated tetramethylol melamine obtained as described above was reacted with 38 parts of pyridine hydrochloride dissolved in 13 parts of octyl alcohol for 5 minutes at 70–80° C. The solution thus obtained was poured into acetone to precipitate the pyridine salt. After filtering and drying a white free-flowing powder was obtained which was extremely soluble in water.

*Example 4*

300 parts by weight of solid methylated tetramethylol melamine and 186 parts by weight of commercial lauryl alcohol were mixed in a reaction vessel equipped for vacuum distillation and the mixture heated slowly to 123° C. At this point a considerable amount of methyl alcohol had distilled out. A vacuum of 70 cm. was then applied and the heating and distilling continued to a temperature of 130° C. and held under these conditions until no more methyl alcohol would distill. This viscous liquid was removed from the reaction vessel and allowed to cool whereupon a plastic solid resin was obtained.

60 parts by weight of the laurylated tetramethylol melamine prepared as described in the preceding paragraph was mixed with 75 parts by weight of a 17% pyridine hydrochloride solution in pyridine and 5 parts by weight of paraformaldehyde. The solution was heated at 50–70° C. until solution occurred, cooled to 0° C. and poured into acetone to precipitate the pyridine salt. The white precipitate was filtered, washed with a little acetone and dried at 50° C. The product was a somewhat sticky powder readily soluble in water to give a strongly foaming solution.

*Example 5*

126 parts (1 mole) of melamine were added to 324 parts (4 moles) of 37% aqueous formaldehyde solution which had been neutralized to a pH of 8.0 by the addition of NaOH solution. The mixture was stirred with gentle heating until solution occurred and then for an additional 15 minutes, after which the batch was cooled and the condensation product crystallized.

25 parts by weight of the tetramethylol melamine prepared in this manner were dissolved in 95% ethyl alcohol and 13 parts of pyridine acetate were added. The mixture was heated at 30–35° C. for 2 hours, after which it was poured into acetone and the pyridinium salt of tetramethylol melamine was recovered by filtration and drying. The product was a white, water-soluble powder.

*Example 6*

Pyridine sulfite was prepared by absorbing 66 parts by weight of sulfur dioxide in 79 parts of pyridine. 20 parts by weight of this salt, dissolved in a suitable solvent, were mixed with 40 parts of the laurylated trimethylol melamine described in Example 4, and the mixture was held at 80° C. until a cloudy, water-soluble solution was obtained. This was poured into ethyl ether and the precipitated material was filtered off and dried at 50° C. The dried material was easily soluble in water to a 10% solution which foamed upon shaking. Cotton cloth was padded in this solution, wrung out to 8% resin solids and dried and cured by heating for 8–10 minutes. It was then found to have good water-repellent properties.

*Example 7*

10 parts by weight of trimethylamine hydrochloride were suspended in 40 parts of ethanol and 25 parts of tetramethylol melamine were added. The mixture was heated at 60° C. for about 15 minutes, or until a clear solution was obtained, after which the reaction mixture was poured into acetone. The resulting precipitate was filtered and dried at 40° C. and the product, which was the quaternary ammonium salt of tetramethylol melamine was obtained as a white, water-soluble powder. When a 10% aqueous solution of this powder was heated to boiling there was formed a white resinous precipitate which cured to a water-insoluble resin upon baking at 140–150° C.

What I claim is:
1. A quaternary ammonium salt of an uncured melamine-formaldehyde condensation product.
2. A quaternary ammonium salt of an uncured alcohol-reacted melamine-formaldehyde condensation product.

3. A quaternary pyridinium salt of an uncured melamine-formaldehyde condensation product.

4. A quaternary pyridinium salt of an uncured alcohol-reacted melamine-formaldehyde condensation product.

5. A quaternary pyridinium salt of an uncured butanol-reacted melamine-formaldehyde condensation product.

6. Quaternary ammonium salts of the formula

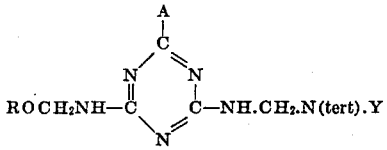

wherein A is a radical of the group consisting of $NH_2$, $-NH.CH_2OR$ and $-N(CH_2OR)_2$, R is a member of the group consisting of hydrogen and alkyl radicals, N(tert) is the molecule of a tertiary nitrogen base and Y is an anion.

7. Quaternary ammonium salts of the formula

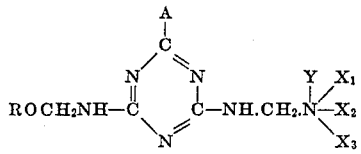

wherein A is a radical of the group consisting of $NH_2$, $-NH.CH_2OR$ and $-N(CH_2OR)_2$, R is a member of the group consisting of hydrogen and alkyl radicals, N(tert) is the molecule of a tertiary nitrogen base, $X_1$, $X_2$ and $X_3$ are lower alkyl radicals and Y is an anion.

8. Quaternary ammonium salts of the formula

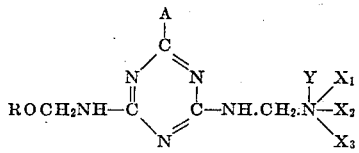

wherein A is a radical of the group consisting of $NH_2$, $-NH.CH_2OR$ and $-N(CH_2OR)_2$, R is a member of the group consisting of hydrogen and alkyl radicals, N(tert) is the molecule of a tertiary nitrogen base, $X_1$, $X_2$ and $X_3$ are lower alkyl radicals and Y is an inorganic anion.

9. Quaternary ammonium salts of the formula

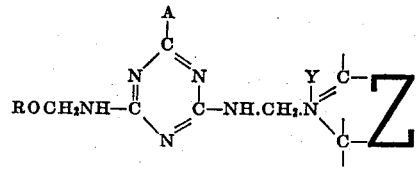

wherein A is a radical of the group consisting of $NH_2$, $-NH.CH_2OR$ and $-N(CH_2OR)_2$, R is a member of the group consisting of hydrogen and alkyl radicals, N(tert) is the molecule of a tertiary nitrogen base, Z is the residue of a pyridine base, and Y is an anion.

10. Quaternary ammonium salts of the formula

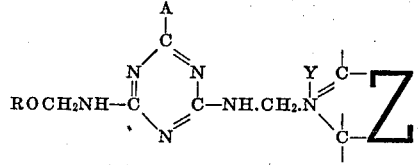

wherein A is a radical of the group consisting of $NH_2$, $-NH.CH_2OR$ and $-N(CH_2OR)_2$, R is a member of the group consisting of hydrogen and alkyl radicals, N(tert) is the molecule of a tertiary nitrogen base, Z is the residue of a pyridine base, and Y is an inorganic anion.

11. A quaternary ammonium salt of a butanol-reacted tetramethylol melamine.

HERBERT J. WEST.

REFERENCES CITED

The following references are of record in the file of this patent:

UNITED STATES PATENTS

| Number | Name | Date |
|---|---|---|
| 2,197,357 | Widmer | Apr. 16, 1940 |
| 2,209,292 | Berger | July 23, 1940 |
| 2,211,709 | Zerweck | Aug. 13, 1940 |
| 2,255,901 | Schroy | Sept. 16, 1941 |
| 2,264,137 | Keller | Nov. 25, 1941 |
| 2,326,727 | Schroy | Aug. 10, 1943 |
| 2,339,768 | D'Alelio | Jan. 25, 1944 |
| 2,340,044 | D'Alelio | Jan. 25, 1944 |
| 2,377,892 | Hood | Mar. 20, 1945 |

FOREIGN PATENTS

| Number | Country | Date |
|---|---|---|
| 495,830 | Great Britain | Nov. 18, 1938 |